United States Patent [19]

Miyazaki

[11] Patent Number: 5,066,761

[45] Date of Patent: Nov. 19, 1991

[54] CURABLE POLYURETHANE CASTING SYSTEMS AND AMINE HARDENERS THEREFOR

[75] Inventor: Teruko Miyazaki, Okemos, Mich.

[73] Assignee: Ciba-Geigy Corporation, Ardsley, N.Y.

[21] Appl. No.: 475,050

[22] Filed: Feb. 5, 1990

Related U.S. Application Data

[62] Division of Ser. No. 274,081, Nov. 21, 1988, Pat. No. 4,927,901.

[51] Int. Cl.$^5$ .............................................. C08G 18/10
[52] U.S. Cl. ................................. 528/64; 252/182.13; 252/182.14; 252/182.23; 252/182.28
[58] Field of Search ............... 528/64; 252/182.13, 252/182.14, 182.23, 182.28

[56] References Cited

U.S. PATENT DOCUMENTS

| | | | |
|---|---|---|---|
| 3,428,610 | 2/1969 | Klebert | 260/75 |
| 4,324,867 | 4/1982 | Patton, Jr. et al. | 521/159 |
| 4,482,690 | 11/1984 | Orphanides | 528/64 |
| 4,786,703 | 11/1988 | Starner et al. | 528/63 |
| 4,816,543 | 3/1989 | Burgoyne, Jr. et al. | 528/64 |

*Primary Examiner*—Maurice J. Welsh
*Attorney, Agent, or Firm*—JoAnn Villamizar

[57] ABSTRACT

An amine hardener comprising diethyltoluenediamine or t-butyl-meta-toluenediamine and 4,4'-methylene orthoethylaniline and curable polyurethane casting systems comprising said hardener and an isocyanate resin.

6 Claims, No Drawings

CURABLE POLYURETHANE CASTING SYSTEMS AND AMINE HARDENERS THEREFOR

This is a divisional of application Ser. No. 274,081 filed Nov. 21, 1988, now U.S. Pat. No. 4,927,901.

The chemistry of combining polyisocyanates and polyols to form prepolymers and the chemistry of curing the prepolymer with active hydrogen containing compounds are well known. The resulting polyurethane systems have been used for a variety of applications such as casting resins, coatings, encapsulants and for general polyurethane elastomeric uses. Unfortunately, pre-existing systems have not exhibited optimum properties for certain of these uses, particularly for casting purposes without the use of 4,4'-methylene dianiline, which is considered a carcinogen. More specifically, curable polyurethane system to obtain roto-moldability and surface castability in the absence of said aniline derivative is needed. In addition to the foregoing, these systems must exhibit specific required properties including minimum color, heat resistance, minimum shrinkage, hardness, impact resistance and low viscosity to facilitate mixing and pouring of the system.

It is therefore the primary object of the present invention to provide a curable polyurethane casting system in the absence of 4,4'-methylene dianiline and an amine hardener system therefor.

It is a further object of the present invention to provide an unfilled room temperature curing casting system which is moisture insensitive, and produces a hard, tough polyurethane-polyurea elastomer which is suitable for roto-molding and surface casting.

A further object of the present invention is to provide improved roto-molding and surfacing casting methods employing the curable polyurethane casting system of the present invention.

Various other objects and advantages of this invention will be readily apparent from the following detailed description thereof.

It has now been surprisingly discovered that by combining diethyltoluenediamine or t-butyl-meta-toluenediamine with 4,4'-methylene-bis-ortho-ethylaniline, an improved nontoxic amine hardener is obtained which when employed in an curable polyurethane casting system produces a polyurethane system exhibiting roto-moldability and surface castability. Thus, the reaction of said amine hardener with an isocyanate resin provides polyurethane systems exhibiting excellent properties. These systems thus exhibit heat resistance, low shrinkage, high hardness, impact resistance and sufficiently high heat deflection temperatures. They exhibit relatively low mixed viscosities which facilitate their ease of mixing and pouring.

The hardeners of the present invention comprise diethyltoluenediamine or t-butyl-meta-toluenediamine and 4,4'-methylene-bis-ortho-ethylaniline, wherein the mole ratio of diethyltoluenediamine or t-butyl-meta-toluenediamine to methylene-bis-ortho-ethylaniline is about 99:1 to about 1:99, preferably about.50:50 to about 95:5, and most preferably about 1:9. Preferably, diethyltoluenediamine is employed.

The hardener can additionally contain plasticizers including phthalates such as dialkyl phthalates, for example, dibutylphthalate; alkyl benzyl phthalates; adipates such as dialkyl adipates; dialkylene glycol benzoates; glutarates, expoxidized vegetable oils, phosphates such as alkyl diaryl phosphates and triarylphosphates; N-substituted pyrrolidones, and the like. A preferred plasticizer is dibutylphthalate.

The curable polyurethane casting system of the present invention comprises said hardener and an isocyanate resin. The amine hardener and the isocyanate resin are present in the ratio of about 32:68 to about 40:60 weight %, preferably about 35:65 to about 39:61 weight % and most preferably about 37:63 to about 38:62 weight %. The isocyanate resin comprises isocyanate terminated polymers of polyisocyanates and polyols.

The polyisocyanate compound is a liquid aliphatic or cycloaliphatic polyisocyanate. Typical of such polyisocyanate compounds are 3-isocyanatomethyl 3,5,5-trimethylcyclohexyl isocyanate (isophorone diisocyanate), 4,4'-methylene bis-(cyclohexylisocyanate), hexamethylene diisocyanate, biuret of hexamethylene diisocyanate, 1,3-cyclohexane bis(methylisocyanate), 2,2,4-trimethylhexamethylene diisocyanate and combinations thereof, as well as related aliphatic and cycloaliphatic polyisocyanates which may be substituted with other organic or inorganic groups that do not adversely affect the course of the reaction. The 4,4'-methylene bis(cyclohexylisocyanate), metaxylene diisocyanate and isophorone diisocyanate are preferred.

The term "aliphatic", as used herein, includes those carbon chains which are substantially non-aromatic in nature. They may be saturated or unsaturated, unbranched, branched or cyclic in configuration and may contain various substituents. Such aliphatic isocyanates generally have an equivalent weight of from 60 to 160 and a viscosity of 1.0 to 1500.0 centipoises at 25° C. Exemplary of the liquid long chain aliphatic polyisocyanates are dodecyl diisocyanate, tridecyl diisocyanate, and the like.

Isocyanate terminated prepolymers are available from REN Plastics such as RP-6414 based on DESMODUR W (Mobay), a cycloaliphatic isocyanate.

The polyols useful in the present invention include polyether diols, polyether triols, polyether tetrols, polyester polyols, caprolactone polyols and the like.

Suitable polyether polyols include aliphatic alkylene glycol polymers having an alkylene unit composed of at least two carbon atoms. These aliphatic alkylene glycol polymers are exemplified by polyoxypropylene glycol and polytetramethylene ether glycol. Di-, tri- and tetrafunctional compounds are available with the trifunctional ones being exemplified by the reaction product of glycerol or trimethylol propane and propylene oxide. A typical polyether polyol is available from Union Carbide under the designation NIAX PPG-425. The difunctional compounds are preferred. Suitable polyether polyols will generally have molecular weights of from 60≅7000 with the diols ranging from 60–4000, the triols from 400–7000 and the tetrols from 400–600. Most preferably polytetramethylene ether glycols exhibiting a molecular weight of about 250 to about 2900, polypropylene ether glycols exhibiting a molecular weight range of about 425 to about 2000, ethylene oxide terminated polypropylene ether glycols exhibiting a molecular weight range of about 650 to about 2000 and mixtures thereof are employed.

The mole ratio of isocyanates to polyols are determined by the properties desired and can be easily determined by those skilled in the art.

The method of producing the isocyanate resin of the present invention comprises adding to the reaction mixture of isocyanates and polyols a catalyst selected from the group consisting of organomercurial salts, organotin salts, bismuth neodecanoate, tertiary amines and the like. Preferably dibutyltin dilaurate is employed as the catalyst. The use of the foregoing catalyst results in a reaction time of about one hour at a temperature of about 80° C. to about 100° C., preferably about 80° C.

Optional additives include anti-foaming agents such as glycerine, an ethyl acrylate-2-ethylhexyl acrylate copolymer, dimethyl siloxane copolymers and silicones; antioxidants such as esters of β-(3,5-di-tert.butyl-4-hydroxyphenyl)-propionic acid with monohydric or polyhydric alcohols, for example, methanol, octadecanol, 1,6-hexanediol, neopentylglycol, thiodiethyleneglycol, diethyleneglycol, triethyleneglycol, pentaerythritol, tris-hydroxyethyl isocyanurate, and di-hydroxyethyl oxalic acid diamide; UV absorbers and light stabilizers such as 2-(2'-hydroxyphenyl)benzotriazoles and sterically hindered amines such as bis-(2,2,6,6-tetramethylpiperidyl)-sebacate, bis-(1,2,2,6,6-pentamethylpiperidyl)-sebacate, n-butyl-3,5-di-tert.butyl-4-hydroxybenzyl malonic acid bis-(1,2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylendiamine and 4-tert.octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4-butane-tetracarbonic acid and 1,1'(1,2-ethanediyl)-bis((3,3,5,5-tetramethylpiperazinone); plasticizers such as phthalates, adipates, glutarates, epoxidized vegetable oils, and the like; fungicides; pigments; dyes; reactive dyes; moisture scavengers; stabilizers such as acid chlorides and hydrogen chloride and the like.

The improved roto-molding method of the present invention comprises the steps of
a) heating the isocyanate resin and amine hardener of the present invention to about 38° C before mixing;
b) mixing said isocyanate resin and said amine hardener;
c) partially filling a mold with said mixture, preferably halfway
d) closing said mold;
e) subjecting said mold to horizontal spinning and vertical rotation simultaneously until said mixture is set forming a casting; and
f) removing said casting from said mold.

The casting made employing the method of the present invention exhibited sufficient impact strength to be demolded and handled.

The improved surface-casting method of the present invention comprises the steps of
a) mixing the isocyanate resin and amine hardener of the present invention;
b) degassing said mixture;
c) pouring said mixture in a surface casting mold;
d) curing said mixture for about 16 to about 24 hours at about room temperature to form a surface cast mold; and
e) demolding said surface cast mold.

The surface cast mold produced thereby shows no crazing or cracking.

The following examples further illustrate an embodiment of the present invention.

EXAMPLES

Example 1.

Preparation of Isocyanate Resin

| INGREDIENTS | PARTS BY WEIGHT |
|---|---|
| Ethylene oxide capped polypropylene ether glycol (MW 650) | 880 |
| Polytetramethylene ether glycol (MW 650) | 440 |
| Polytetramethylene ether glycol (MW 1000) | 622.24 |
| Methylene bis(4-cyclohexylisocyanate) | 1776 |
| Isophorone diisocyanate | 280 |
| Dibutyltin dilaurate | 0.12 |
| Silicone | 1.20 |
| Benzoyl chloride | 0.44 |

A five-liter round-bottomed reaction flask with a four-neck flask head is equipped with a mechanical stirrer, thermometer, nitrogen inlet, vacuum connection and heating mantle connected to a temperature regulator.

Three polyols are charged and stirred for one hour at 80° C. under vacuum. Two isocyanates and dibutyltin dilaurate are added and the reaction mixture is stirred for one hour at 80° -100° C. under nitrogen. The reaction completion is determined by analyzing % NCO. Silicone is added and the mixture is cooled to 50° C. while being deaired under vacuum. Benzoyl chloride is added and deairing is continued until the product is cooled to the room temperature. The final % NCO is determined.

Example 2.

Preparation of Hardener

| INGREDIENTS | PARTS BY WEIGHT |
|---|---|
| 4,4'-methylene-bis-ortho-ethylaniline | 1188.0 |
| Diethyltoluenediamine | 91.2 |
| Dibutyl phthalate | 1120.8 |

A three-liter round-bottomed reaction flask with a four-neck flask head is equipped with a mechanical stirrer, thermometer, vacuum connection and heating mantle connected to a temperature regulator. All ingredients are charged and stirred for one hour at 80° C. under vacuum. The moisture content is determined, (necessarily being maintained below 0.05%). The mixture is stirred under vacuum until it cools to room temperature.

Example 3.

Properties

The resin (Example 1) and hardener (Example 2) are mixed in a weight ratio of 100/60, deaired and cast to prepare test specimens. TABLE 1 summarizes the excellent properties obtained.

TABLE 1

| Property | Method | Result |
|---|---|---|
| Viscosity @ 25° C. | Brookfield RVF | |
| Resin | (Spindle #4 @ 20 rpm) | 7600–9300 cps |
| Hardener | (Spindle #1 @ 20 rpm) | 120–150 cps |
| Mixed | (Spindle #4 @ 20 rpm) | 2300–2500 cps |
| Work Life @ 25° C.** | 160 g, to 5,000 cps Brookfield RVF (Spindle #4 @ 20 rpm) | 10–20 min. |
| Gel Time @ 25° C.** | 160 g, to 100,000 cps | 17–21 min. |

TABLE 1-continued

| Property | Method | Result |
|---|---|---|
| | Brookfield RVF | |
| | (Spindle #4 @ 2 rpm) | |
| Specific Gravity, | | |
| Resin | WPG cup | 1.06 |
| Hardener | WPG cup | 1.05 |
| Cured* | ASTM D-792 | 1.09 |
| Shrinkage* | ASTM D-2566 | 0.0023 in/in |
| Tensile Strength* | ASTM D-638 | 3850 psi |
| Elongation* | ASTM D-638 | 240% |
| Tear Strength* | ASTM D-624 | 692 psi |
| Hardness* | ASTM D-2240 | 65D |
| Deflection Temperature* @ 66 psi | ASTM D-648 | 61° C. |
| Peak Exotherm*** | 454 g, Honeywell Temperature Recorder with J Thermocouple | 84° C. |

*Tested after 7 day RT cure.
**Gel Time and Work Life are determined by running a viscosity profile on a 160 g mixed samples using a Brookfield RVF viscometer with Spindle #4. The spindle speed is lowered as the viscosity increases to get viscosity readings on scale. The time required to obtain viscosities of 5,000 cps and 100,000 cps are designated as Work Life and Gel Time, respectively. Gel Time and Work Life relate to the handling time to mix, deair and apply the system and the time needed to set and cure the system. A sufficiently long Gel Time and Work Life is needed to allow time to mix, deair and apply the system but not so long that the setting and cure time delay the production operation.
***The Peak Exotherm relates to shrinkage, cracking and deterioration of molds and the set and cure time of the system. Too high a Peak Exotherm results in shrinkage, cracking and deterioration of molds and too low a Peak Exotherm results in long set and cure time delaying the production process.

*** The Peak Exotherm related to shrinkage, cracking and deterioration of molds and the set and cure time of the system. Too high a Peak Exotherm results in shrinkage, cracking and deterioration of molds and too low a Peak Exotherm results in long set and cure time delaying the production process.

Example 4.

Surface casting

A lightweight filled epoxy block (1-6/8"×3-6/8"×9-6/8") is suspended with screws in a closed steel mold (inner dimension 2"×4"×10") parted with a release agent, allowing ⅛ inch space all around the block to be filled with the polyurethane.

The resin (Example 1) 270 g and hardener (Example 2) 162 g are mixed in a dry gallon container, degassed for 3-5 minutes in a vacuum chamber to remove air and poured into the steel mold through the opening on the top until the resin start to escape from the vent holes. The system is allowed to cure for 16-24 hours at the room temperature. When the block is demolded, it is covered with a ⅛ inch thick polyurethane layer that shows no crazing or cracking.

Example 5.

Roto-molding

Both the resin (Example 1) and hardener (Example 2) are heated at 38° C before mixing. The mold is filled halfway with the mixture, closed, and placed on the roto-mold equipment. The mold is subjected to horizontal spinning and vertical rotation simultaneously until the resin set (45-60 minutes). The speeds of spin and rotation vary depending on the shape being cast.

When the mold is opened, a hollow casting with a uniform wall thickness is formed. The parts exhibit enough impact strength to be demolded and handled.

What is claimed is:

1. An amine hardener comprising
   (a) diethyltoluenediamine or t-butyl-meta-toluenediamine and
   ((b) 4,4'-dimethylene-bis-ortho-ethylaniline in a molar ratio of from about 99:1 to about 1:99.
2. The amine hardener according too claim 1 wherein said mole ratio is about 50:50 to about 5:95.
3. The amine hardener according to claim 2 wherein said mole ratio is about 1:9.
4. The amine hardener according to claim 1 further comprising a plasticizer.
5. The amine hardener according to claim 5 wherein the plasticizer is selected from the group consisting of dialkyl phthalates, alkyl benzyl phthalates, dialkyl adipates, dialkylene glycol dibenzoates, alkyl diarylphosphates, triarylphosphates and N-substituted pyrrolidones.
6. The hardener system according to claim 5 wherein the plasticizer is dibutyl phthalate.

* * * * *